United States Patent
Adler et al.

(10) Patent No.: US 11,218,857 B2
(45) Date of Patent: Jan. 4, 2022

(54) METHOD OF BLUETOOTH PHASE BASED RANGING DURING ADVERTISEMENT AND CONNECTION

(71) Applicant: Continental Automotive Systems, Inc., Auburn Hills, MI (US)

(72) Inventors: Aaron Adler, Rochester Hills, MI (US); Djordje Preradovic, Shelby Township, MI (US); David Reimus, Waterford, MI (US); Akshay Choudhari, Troy, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 190 days.

(21) Appl. No.: 16/724,575

(22) Filed: Dec. 23, 2019

(65) Prior Publication Data

US 2021/0051457 A1    Feb. 18, 2021

Related U.S. Application Data

(60) Provisional application No. 62/887,256, filed on Aug. 15, 2019.

(51) Int. Cl.
| | | |
|---|---|---|
| *H04W 4/80* | (2018.01) | |
| *H04L 29/06* | (2006.01) | |
| *G01S 13/36* | (2006.01) | |
| *H04W 84/18* | (2009.01) | |

(Continued)

(52) U.S. Cl.
CPC ............... *H04W 4/80* (2018.02); *G01S 13/36* (2013.01); *H04L 69/22* (2013.01); *H04W 84/18* (2013.01)

(58) Field of Classification Search
CPC ......... H04W 4/80; H04W 84/18; H04W 4/20; H04L 69/22; G01S 13/36; G01S 13/84
See application file for complete search history.

(56) References Cited

U.S. PATENT DOCUMENTS

| | | | |
|---|---|---|---|
| 2018/0299531 A1* | 10/2018 | Hiscock | H04L 5/0044 |
| 2019/0090081 A1* | 3/2019 | Heydon | H04L 1/0057 |
| 2020/0067633 A1* | 2/2020 | Carsello | H04B 7/26 |

(Continued)

FOREIGN PATENT DOCUMENTS

| | | |
|---|---|---|
| KR | 1020190093956 A | 8/2019 |
| WO | 2018222024 A1 | 12/2018 |

OTHER PUBLICATIONS

Pouria Zand et al. A high-accuracy phase-based ranging solution with Bluetooth Low Energy (BLE), Conference Paper, Apr. 25, 2019, pp. 1-8, ResearchGate, Retrieved from the Internet Oct. 27, 2020, URL: https://www.researchgate.net/publication/332655909.

(Continued)

*Primary Examiner* — Asghar H Bilgrami

(57) ABSTRACT

A method for phase ranging of a personal area network device includes receiving an initial personal area network packet and storing header information contained in the initial personal area network packet. A phase shift is measured utilizing information transmitted in place of the stored header information in at least one incoming personal area network packet. A range of the personal area network device is calculated based on the phase shift of the information transmitted in place of the stored header information in an incoming personal area network packet.

25 Claims, 2 Drawing Sheets

(51) Int. Cl.
*H04W 4/20* (2018.01)
*G01S 13/84* (2006.01)

(56) References Cited

U.S. PATENT DOCUMENTS

2020/0137542 A1    4/2020  Jung et al.
2020/0322070 A1*  10/2020  Zhang ................ H04L 25/0262

OTHER PUBLICATIONS

"From cable replacement to the IoT Bluetooth 5.1", White Paper, 1MA108_4e, Jun. 5, 2019, pp. 1-41, Rohde & Schwarz, Retrieved from the Internet Oct. 27, 2020, URL: www.rohde-schwarz.com/appnote/1MA108.

Yongchang He "Experimental setup for Bluetooth low energy ranging application", Master Thesis, Aug. 31, 2017, TU/e Eindhoven University of Technology, pp. 1-72, Retrieved from the Internet Oct. 27, 2020, URL: https://research/tue.nl/en/student/Theses/experimental-setup-for-bluetooth-low-energy-ranging-application.

International Search Report and Written Opinion dated Nov. 6, 2020 from corresponding International Patent Application No. PCT/US2020/046322.

* cited by examiner

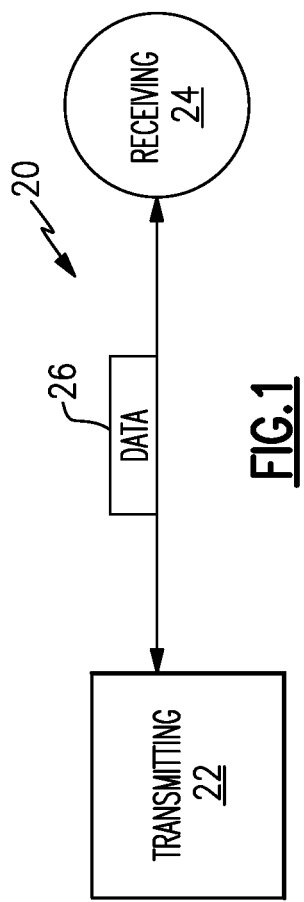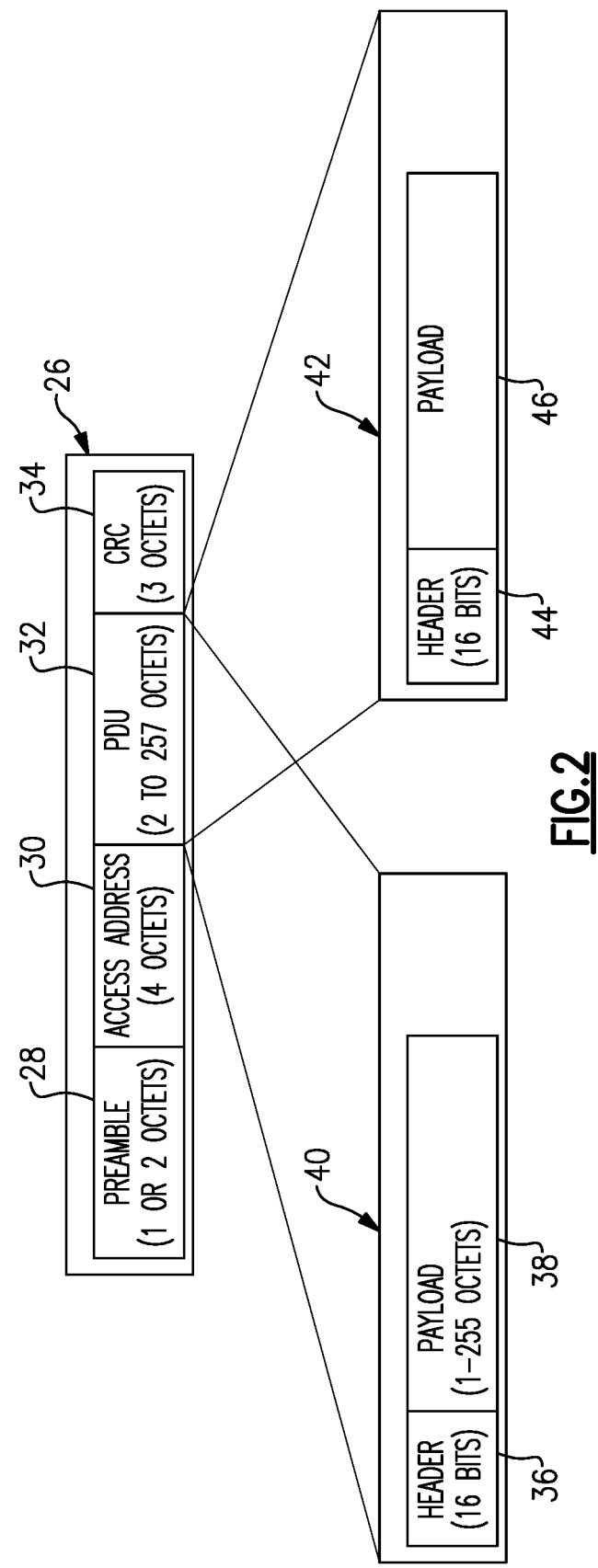

METHOD OF BLUETOOTH PHASE BASED RANGING DURING ADVERTISEMENT AND CONNECTION

CROSS REFERENCE TO RELATED APPLICATION

This application claims priority to U.S. Provisional Application No. 62/887,256 filed Aug. 15, 2019.

TECHNICAL FIELD

This disclosure relates to radio frequency receivers with multiple channels and modules, and in particular to a system and method utilizing Bluetooth Low Energy ("BLE") compliant wireless personal area network data packets for ranging during advertisement and connection.

BACKGROUND

BLE compliant packets include a preamble, access address, protocol data unit ("PDU") and a cyclic redundancy check ("CDC"). BLE packets can be lengthy and therefore require additional time that is not necessary for ranging.

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method for phase ranging of a personal area network device according to according to an exemplary embodiment of this disclosure, among other possible things includes receiving an initial personal area network packet, storing header information contained in the initial personal area network packet, measuring a phase shift utilizing information transmitted in place of the stored header information in at least one incoming personal area network packet and calculating a range of the personal area network device based on the phase shift of the information transmitted in place of the stored header information in at least one portion of the at least one incoming personal area network packet.

In another embodiment of the foregoing method, the phase shift is measured based on a phase based ranging sequence transmitted in place of the stored header information for at least one incoming personal area network packet.

In another embodiment of any of the foregoing methods, phase based ranging sequence of the at least one incoming personal area network packet comprises 16 bits.

In another embodiment of any of the foregoing methods, the header of the at least one incoming personal area network packet is a Bluetooth Low Energy personal area network packet.

In another embodiment of any of the foregoing methods, the header of the at least one incoming personal area network packet is a standard header of a personal area network packet.

In another embodiment of any of the foregoing methods, the standard header of the personal area network packet is an unwhitened header.

In another embodiment of any of the foregoing methods, the header of the at least one incoming personal area network packet is a whitened header.

Another embodiment of any of the foregoing methods, includes maintaining communication utilizing stored header information from a first personal area network packet while calculating the range of the personal area network device based on a phase shift of a phase based ranging information transmitted in place of the header information from at least one subsequent personal area network packet.

In another embodiment of any of the foregoing methods, calculating the range of the personal area network device is based not based on a phase shift of a payload of the personal area network packet nor any of the at least one incoming personal area network packet.

In another embodiment of any of the foregoing methods, calculating the range of the personal area network device is based on a phase shift of only a phase based ranging sequence transmitted in place of the header information of the at least one incoming personal area network packet.

In another embodiment of any of the foregoing methods, measuring the phase shift comprises analyzing in-phase and quadrature components of a signal carrying the at least one portion of at least one incoming personal area network packet.

In another embodiment of any of the foregoing methods, calculating the range of the personal area network device comprises accounting for a predetermined delay of the personal area network device.

In another embodiment of any of the foregoing methods, the predetermined delay of the personal area network device comprises a delay predicted to occur within the personal area network device.

In another embodiment of any of the foregoing methods, the predetermined delay of the personal area network device comprises a reception delay of the personal area network device.

In another embodiment of any of the foregoing methods, the predetermined delay of the personal area network device comprises a transmission delay of the personal area network device.

In another embodiment of any of the foregoing methods, the predetermined delay of the personal area network device comprises a processing delay of the personal area network device.

In another embodiment of any of the foregoing methods, the header from at least one subsequent personal area network packet is not utilized for maintaining communication for a predetermined number of packets.

In another embodiment of any of the foregoing methods, the at least one incoming personal area network packet comprises a plurality of incoming personal area network packets wherein the plurality of incoming personal area network packets comprises at least the first packet and the second packet, wherein the first packet is carried by a carrier of a different frequency than the carrier of the second packet.

A personal area networking system according to another exemplary embodiment includes, among other possible things, a transmitter device configured to generate a personal area network packet including a header and a receiving device configured to receive the personal area network packet, wherein the receiving device is further configured to save the header from an initial personal area network packet and the transmitting device is further configured to transmit a phase based ranging sequence in place of the header information in at least one subsequent personal area network packet for determining a distance between the transmitting device and the receiving device.

In another exemplary embodiment of the foregoing system, the header of the first incoming personal area network packet comprises 16 bits.

In another exemplary embodiment of any of the foregoing systems, the header of the first incoming personal area network packet is a Bluetooth Low Energy personal area network packet.

In another exemplary embodiment of any of the foregoing systems, the header of the first incoming personal area network packet is a standard header of a personal area network packet and is an unwhitened header.

In another exemplary embodiment of any of the foregoing systems, the header of the first incoming personal area network packet is a standard header of a personal area network packet and is a whitened header.

In another exemplary embodiment of any of the foregoing systems, the receiving device is further configured to maintain communication utilizing the saved header information from a first personal area network packet while calculating the range of the personal area network device based on the phase based ranging sequence contained in place of the header in the at least one subsequent personal area network packet.

In another exemplary embodiment of any of the foregoing systems, calculating the range of the personal area network device is based on a phase shift of only the phase based ranging sequence transmitted in place of the stored header information of the first incoming personal area network packet and not based on a phase shift of a payload of the personal area network packet nor any other portion of incoming personal area network packets.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 1 is a schematic of an example personal area networking system.

FIG. 2 is a schematic view of personal area network packets.

DETAILED DESCRIPTION

Figure 3:
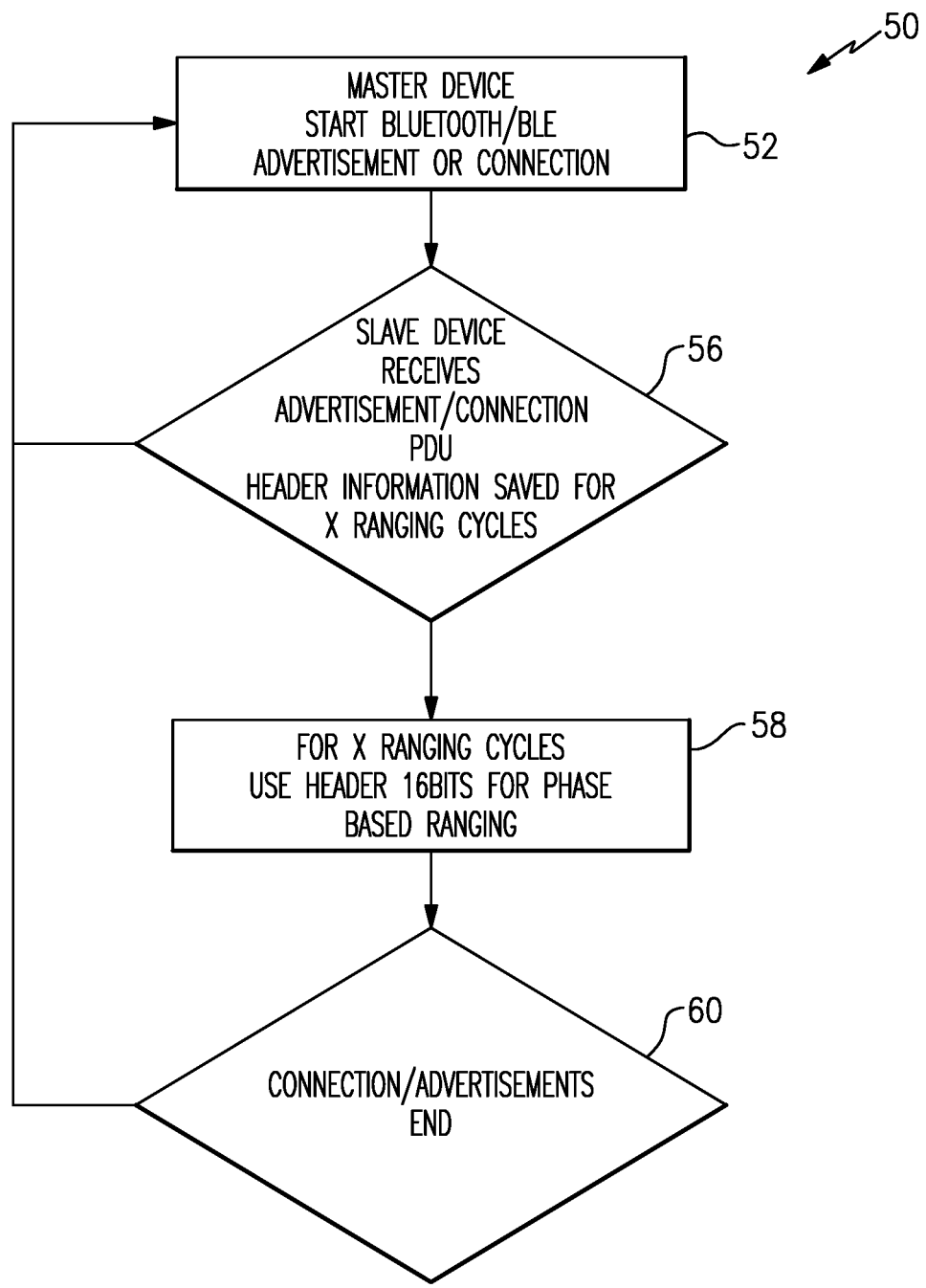
FIG. 3 is a flow diagram illustrating method steps for a disclosed method of phase ranging of a personal area network device.

Referring to FIG. 1, networking system 20 including a transmitting device 22 and a receiving device 24 is schematically shown. The transmitting device 22 and the receiving device 24 exchange data packets 26 to establish a communication link and to determine a distance therebetween. The disclosed example transmitting device 22 and the receiving device 24 are Bluetooth Low Energy ("BLE") devices that exchange information according to known BLE protocols.

BLE compliant packets can be lengthy and require additional time that is not necessary for range determination. The example system 20 and method decreases ranging time using standard BLE compliant data packets by substituting header information for phase based ranging sequences.

Referring to FIG. 2, with continued reference to FIG. 1, BLE compliant packets such as the example packet 26 comprises a Preamble 28, Access Address 30, protocol data unit ("PDU") 32, and Cyclic Redundancy Check ("CRC") 34. The PDU 32 further includes a header 36 and data payload 38. The header 36 includes information that is common to each data packet 40. In other words, each of a plurality of PDU 32 from the transmitting device 22 includes the same information in the header 36. The disclosed method saves information from an initial header 36 within the receiving device 24 and sends phase based ranging sequences 44 in place of the initial header information 36 in a subsequent number of PDU's 42. The phase based ranging sequences utilize known phase based ranging methods to provide distance information while the receiving device 24 maintains the information in the initial header 36 for use with the subsequent PDU's 42.

Accordingly, the disclosed method conducts BLE phase-based ranging using the time and space where the header information 36 would typically be repeated. The header 36 can be part of both advertisements and connection packets and can consist of whitened or unwhitened data. The standard header is 16 bits in length. The header can be whitened or unwhitened data and may consist of all 1's or all 0's of the 16 bits.

In one example embodiment, the standard header 36 will be transmitted during the first advertisement or connection data packet 40 to establish a communication like with the receiving device 24. The data space of the header is then utilized to transmit phase based ranging sequences 44 for a predefined number of subsequent ranging cycles.

In an embodiment, after the first header 36 has been used by the receiving device 24, the header space in a subsequent PDU 42 is replaced by the phase based ranging sequences 44 needed to perform the phase based measurements for phase based ranging. The initial header 36 of the first advertisement or connection data packet 40 is stored.

After a predefined number of subsequent data packets 42, the initial data packet 40 with the initial header 36 is retransmitted and the cycle repeated. In one disclosed example, five (5) subsequent data packets 42 follow each first or initial data packet 40. As appreciated, although a number of subsequent data packets 42 is disclosed by way of example, ten, twenty, or any predefined number of subsequent data packets 42 could be utilized to tailor operation to application specific requirements.

Referring to FIG. 3 with continued reference to FIGS. 1 and 2, an exemplary method is schematically shown at 50. The method 50 begins with a master/transmitting device 22 transmitting BLE advertisement/connection data packets 26 as is indicated at 52. The data packet 26 is received with a slave/receiving device 24 that receives the initial PDU 40 from the advertisement/connection data packet 26. The slave/receiving device 24 saves the header information 36 for a predefined number of ranging exchanges as is shown at 56. In one example, the header information 36 is stored for (5) subsequent PDUs 42.

Because the header 36 is stored, each subsequent one of the ranging exchanges can use the bit space previously utilized for the header for phase based ranging sequences as is indicated at 58. Using the phase based ranging sequence instead of repeating the same header information decreases the amount of time needed to conduct phase based ranging during a ranging sequence. Moreover, because the number of bits allocated to the header 36 is relative small, the amount of time utilized for phase based ranging is reduced.

Once the predefined number of ranging cycles is reached as is indicated at 60, the header 36 is resent as part of another initial or first packet 40 that is transmitted to and stored in the receiving device 24 to restart the ranging process.

The header of the incoming personal area network packet 5 is a standard header of a personal area network packet. The standard header maybe an unwhitened header or a whitened header. The stored header 26 from the first personal area network packet 56 is used by the receiving device 24 while calculating the range based on a phase shift of a phase based ranging information transmitted in place of the header information in subsequent personal area network packets 42.

The range of the personal area network device is not based on a phase shift of payloads 38, 46 of the personal area network packets 40, 42. Instead, the range of the receiving device 24 relative to the transmitting device 22 is based on a phase shift of only a phase based ranging sequence 44 transmitted in place of the header 36 information of the initial packet 40.

The phase measurement may be accomplished according to known processes and techniques. Accordingly, all know phase based ranging techniques and methods are within the contemplation and scope of this disclosure. In one example embodiment, measuring the phase shift comprises analyzing in-phase and quadrature components of a signal including the phase based ranging sequences saved in the bit space of the header.

In another disclosed example embodiment, calculating the range comprises accounting for a predetermined delay of one of the personal area network devices 22, 24. The predetermined delay can comprise a delay predicted to occur within the personal area network device. The delay of the personal area network device can comprise a reception or a transmission delay of the personal area network device. The predetermined delay of the personal area network device can further comprise a processing delay.

In another disclosed embodiment, the header from at least one subsequent personal area network packet is not utilized for maintaining communication for a predetermined number of packets. In another disclosed embodiment, a first packet is carried by a carrier of a different frequency than the carrier for a second packet.

Since the headers can be used for this measurement instead of additional bits in the payload. This method also allows the unwhitening of bits which will allow for correct frequency estimation of bits and no dewhitening sequence to be required.

Accordingly, the disclosed system and method utilizes bit space within a header for phase based ranging instead of an entire PDU. Information from an initial header is stored to provide bit space for the phase based ranging information used to determine a range between BLE devices.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A method for phase ranging of a personal area network device comprising:
   receiving an initial personal area network packet;
   storing header information contained in the initial personal area network packet;
   measuring a phase shift utilizing information transmitted in place of the stored header information in at least one incoming personal area network packet; and
   calculating a range of the personal area network device based on the phase shift of the information transmitted in place of the stored header information in at least one portion of the at least one incoming personal area network packet.

2. The method as claimed in claim 1, wherein the phase shift is measured based on a phase based ranging sequence transmitted in place of the stored header information for at least one incoming personal area network packet.

3. The method as claimed in claim 2, wherein the phase based ranging sequence of the at least one incoming personal area network packet comprises 16 bits.

4. The method as claimed in claim 2, wherein the header of the at least one incoming personal area network packet is a Bluetooth Low Energy personal area network packet.

5. The method as claimed in claim 2, wherein the header of the at least one incoming personal area network packet is a standard header of a personal area network packet.

6. The method as claimed in claim 5, wherein the standard header of a personal area network packet is an unwhitened header.

7. The method as claimed in claim 2, wherein the header of the at least one incoming personal area network packet is a whitened header.

8. The method as claimed in claim 1, further comprising maintaining communication utilizing stored header information from a first personal area network packet while calculating the range of the personal area network device based on a phase shift of a phase based ranging information transmitted in place of the header information from at least one subsequent personal area network packet.

9. The method as claimed in claim 8, wherein calculating the range of the personal area network device is based not based on a phase shift of a payload of the personal area network packet nor any of the at least one incoming personal area network packet.

10. The method as claimed in claim 8, wherein calculating the range of the personal area network device is based on a phase shift of only a phase based ranging sequence transmitted in place of the header information of the at least one incoming personal area network packet.

11. The method as claimed in claim 1 wherein measuring the phase shift comprises analyzing in-phase and quadrature components of a signal carrying the at least one portion of at least one incoming personal area network packet.

12. The method as claimed in claim 1 wherein calculating the range of the personal area network device comprises accounting for a predetermined delay of the personal area network device.

13. The method as claimed in claim 12, wherein the predetermined delay of the personal area network device comprises a delay predicted to occur within the personal area network device.

14. The method as claimed in claim 12, wherein the predetermined delay of the personal area network device comprises a reception delay of the personal area network device.

15. The method as claimed in claim 13 wherein the predetermined delay of the personal area network device comprises a transmission delay of the personal area network device.

16. The method as claimed in claim 13, wherein the predetermined delay of the personal area network device comprises a processing delay of the personal area network device.

17. The method as claimed in claim 8, wherein the header from at least one subsequent personal area network packet is not utilized for maintaining communication for a predetermined number of packets.

18. The method as claimed in claim 1, wherein the at least one incoming personal area network packet comprises a plurality of incoming personal area network packets wherein the plurality of incoming personal area network packets comprises at least the first packet and the second packet, wherein the first packet is carried by a carrier of a different frequency than the carrier of the second packet.

19. A personal area networking system comprising:
a transmitter device configured to generate a personal area network packet including a header; and
a receiving device configured to receive the personal area network packet, wherein the receiving device is further configured to save the header from an initial personal area network packet and the transmitting device is further configured to transmit a phase based ranging sequence in place of the header information in at least one subsequent personal area network packet for determining a distance between the transmitting device and the receiving device.

20. The personal area networking system as recited in claim 19, wherein the header of the first incoming personal area network packet comprises 16 bits.

21. The personal area networking system as recited in claim 20, wherein the header of the first incoming personal area network packet is a Bluetooth Low Energy personal area network packet.

22. The personal area networking system as recited in claim 21, wherein the header of the first incoming personal area network packet is a standard header of a personal area network packet and is an unwhitened header.

23. The personal area networking system as claimed in claim 21, wherein the header of the first incoming personal area network packet is a standard header of a personal area network packet and is a whitened header.

24. The personal area networking system as recited in claim 19, wherein the receiving device is further configured to maintain communication utilizing the saved header information from a first personal area network packet while calculating the range of the personal area network device based on the phase based ranging sequence contained in place of the header in the at least one subsequent personal area network packet.

25. The personal area networking system as claimed in claim 19, wherein calculating the range of the personal area network device is based on a phase shift of only the phase based ranging sequence transmitted in place of the stored header information of the first incoming personal area network packet and not based on a phase shift of a payload of the personal area network packet nor any other portion of incoming personal area network packets.

* * * * *